(12) United States Patent
Chakraborty (10) Patent No.: US 8,079,269 B2
(45) Date of Patent: Dec. 20, 2011

(54) ELECTROSTATIC PRESSURE SENSOR WITH POROUS DIELECTRIC DIAPHRAGM

(75) Inventor: Swapan Chakraborty, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 74 days.

(21) Appl. No.: 11/803,971

(22) Filed: May 16, 2007

(65) Prior Publication Data

US 2008/0282806 A1 Nov. 20, 2008

(51) Int. Cl.
*G01L 7/08* (2006.01)
(52) U.S. Cl. ............... 73/715; 73/716; 73/717; 73/723; 73/724; 361/283.1; 361/283.4
(58) Field of Classification Search ............ 73/700–756; 361/283.1–283.4

See application file for complete search history.

(56) References Cited

U.S. PATENT DOCUMENTS

| | | | | |
|---|---|---|---|---|
| 3,424,953 A * | 1/1969 | Bean | | 361/434 |
| 3,814,998 A * | 6/1974 | Thoma et al. | | 361/283.4 |
| 4,020,235 A | 4/1977 | Giuffre et al. | | |
| 4,169,389 A * | 10/1979 | Yasuhara et al. | | 73/718 |
| 4,186,076 A | 1/1980 | de Nora et al. | | |
| 4,311,566 A | 1/1982 | McCann | | |
| 4,606,805 A | 8/1986 | Bon | | |
| 4,645,572 A * | 2/1987 | Nishizawa et al. | | 205/784 |
| 5,215,644 A * | 6/1993 | Ashikaga | | 204/412 |
| 5,561,247 A | 10/1996 | Mutoh et al. | | |
| 5,608,154 A * | 3/1997 | Kato et al. | | 73/23.31 |
| 5,705,751 A * | 1/1998 | Briefer et al. | | 73/722 |
| 6,012,902 A | 1/2000 | Parce | | |
| 6,013,164 A | 1/2000 | Paul et al. | | |
| 6,019,882 A | 2/2000 | Paul et al. | | |
| 6,171,067 B1 | 1/2001 | Parce | | |
| 6,277,257 B1 | 8/2001 | Paul et al. | | |
| 6,295,875 B1 * | 10/2001 | Frick et al. | | 73/718 |
| 6,370,959 B1 * | 4/2002 | Schwager | | 73/715 |
| 6,394,759 B1 | 5/2002 | Parce | | |

(Continued)

FOREIGN PATENT DOCUMENTS

CA 2353243 7/2001

(Continued)

OTHER PUBLICATIONS

S. Minc. J. Dabkowski, B. Kostrzewa; "Electrokinetic phenomena at the Al2O3 mixture of polar liquids interface"; May 13, 1977; Journal of Applied Electronchemistry 8 (1978); See pp. 1-4.*

(Continued)

*Primary Examiner* — Lisa Caputo
*Assistant Examiner* — Jermaine Jenkins
(74) *Attorney, Agent, or Firm* — Kinney & Lange, P.A.

(57) ABSTRACT

A pressure sensor comprises a first pressure chamber containing fill fluid at a first pressure, a second pressure chamber containing fill fluid at a second pressure, a porous dielectric diaphragm having first and second major surfaces exposed to the first and second pressure chambers, and first and second electrodes positioned with respect to the first and second major surfaces. A method for sensing pressure is also disclosed, comprising applying first and second pressures to fill fluid in first and second pressure chambers of a pressure sensor having a porous dielectric diaphragm, and producing an output representative of a pressure differential between the pressures, as a function of surface charges on first and second major surfaces of the porous dielectric diaphragm.

29 Claims, 10 Drawing Sheets

U.S. PATENT DOCUMENTS

| | | |
|---|---|---|
| 6,532,386 B2 | 3/2003 | Sun et al. |
| 6,568,275 B2 * | 5/2003 | Scholz et al. ............... 73/718 |
| 6,568,910 B1 | 5/2003 | Parce |
| 6,572,749 B1 | 6/2003 | Paul et al. |
| 6,606,911 B2 * | 8/2003 | Akiyama et al. ............. 73/718 |
| 6,720,710 B1 | 4/2004 | Wenzel et al. |
| 6,766,620 B2 | 7/2004 | Robbins |
| 7,010,964 B2 | 3/2006 | Karp et al. |
| 7,021,148 B2 * | 4/2006 | Kuhn et al. ................. 73/715 |
| 7,073,375 B2 * | 7/2006 | Parker et al. ............ 73/114.76 |
| 7,081,189 B2 | 7/2006 | Squires et al. |
| 7,094,326 B2 | 8/2006 | Crocker et al. |
| 7,169,847 B2 | 1/2007 | Solomon et al. |
| 7,181,975 B1 * | 2/2007 | Bradley et al. .............. 73/724 |
| 7,259,573 B2 * | 8/2007 | Andrade ..................... 324/678 |
| 7,437,938 B2 * | 10/2008 | Chakraborty ............... 73/714 |
| 2006/0137749 A1 | 6/2006 | Bonne et al. |

FOREIGN PATENT DOCUMENTS

| | | |
|---|---|---|
| EP | 0 003 851 B1 | 10/1981 |
| WO | WO 02/068100 A1 | 9/2002 |

OTHER PUBLICATIONS

International Search Report for corresponding PCT Application No. PCT/US08/06105 mailed Aug. 8, 2008 (3 pages).

Written Opinion of the International Searching Authority for corresponding PCT Application No. PCT/US08/06105 mailed Aug. 8, 2008 (5 pages).

* cited by examiner

ELECTROSTATIC PRESSURE SENSOR WITH POROUS DIELECTRIC DIAPHRAGM

BACKGROUND OF THE INVENTION

The present invention relates generally to pressure sensing, and in particular to pressure sensing via the electrostatic effects of fluid flow through a porous dielectric diaphragm.

Accurate, reliable pressure measurements are important to many industries, including not only fluid processing but also related applications in health care, agriculture, transportation, construction, and other areas. Precision pressure sensors are also critical to basic scientific research, whether in microfluidics and other flow processes or the broader fields of chemistry, biology, engineering, and the material sciences.

Existing pressure sensing technologies range from traditional spring gauges to advanced micromechanical sensors, capacitive-type electrostatic pressure sensors, and semiconductor piezoresistive or piezoelectric sensors. These devices address a variety of specific applications in the industries described above. Nonetheless, there remains an ongoing need for reliable, cost-effective pressure sensors that exhibit beneficial scale sensitivity over a broad operational range. There remains a particular need, moreover, for techniques that are relatively insensitive to temperature extremes, vibrations, and other environmental effects, and relatively independent of stress, strain, and fatigue, and other mechanical limitations that characterize the prior art.

BRIEF SUMMARY OF THE INVENTION

An electrostatic pressure sensing device consists of first and second pressure chambers, a porous dielectric diaphragm, first and second electrodes, and a fill fluid. The porous dielectric diaphragm divides the first and second pressure chambers, such that a first major surface of the diaphragm is exposed to the first pressure chamber and a second major surface is exposed to the second pressure chamber. The first electrode is positioned with respect to the first major surface of the diaphragm, and the second electrode is positioned with respect to the second major surface.

The fill fluid fills the first and second pressure chambers and permeates the porous dielectric diaphragm. The pressure chambers are subject to first and second pressures, such that the fill fluid flows across the diaphragm in response to a difference between the two pressures. This induces an electric signal on the first and second electrodes, which is a function of the pressure difference. The signal depends substantially upon the molecular properties of the fill fluid and the porous dielectric diaphragm, and is generally independent of the diaphragm's mechanical properties such as response to stress and strain.

A method is also disclosed for measuring a pressure across a porous dielectric diaphragm. The method comprises applying pressures to fill fluid in first and second pressure chambers of a pressure sensor and producing an output representative of a pressure difference between the pressures, as a function of surface charges on first and second major surfaces of the porous dielectric diaphragm.

DETAILED DESCRIPTION

Figure 1A:
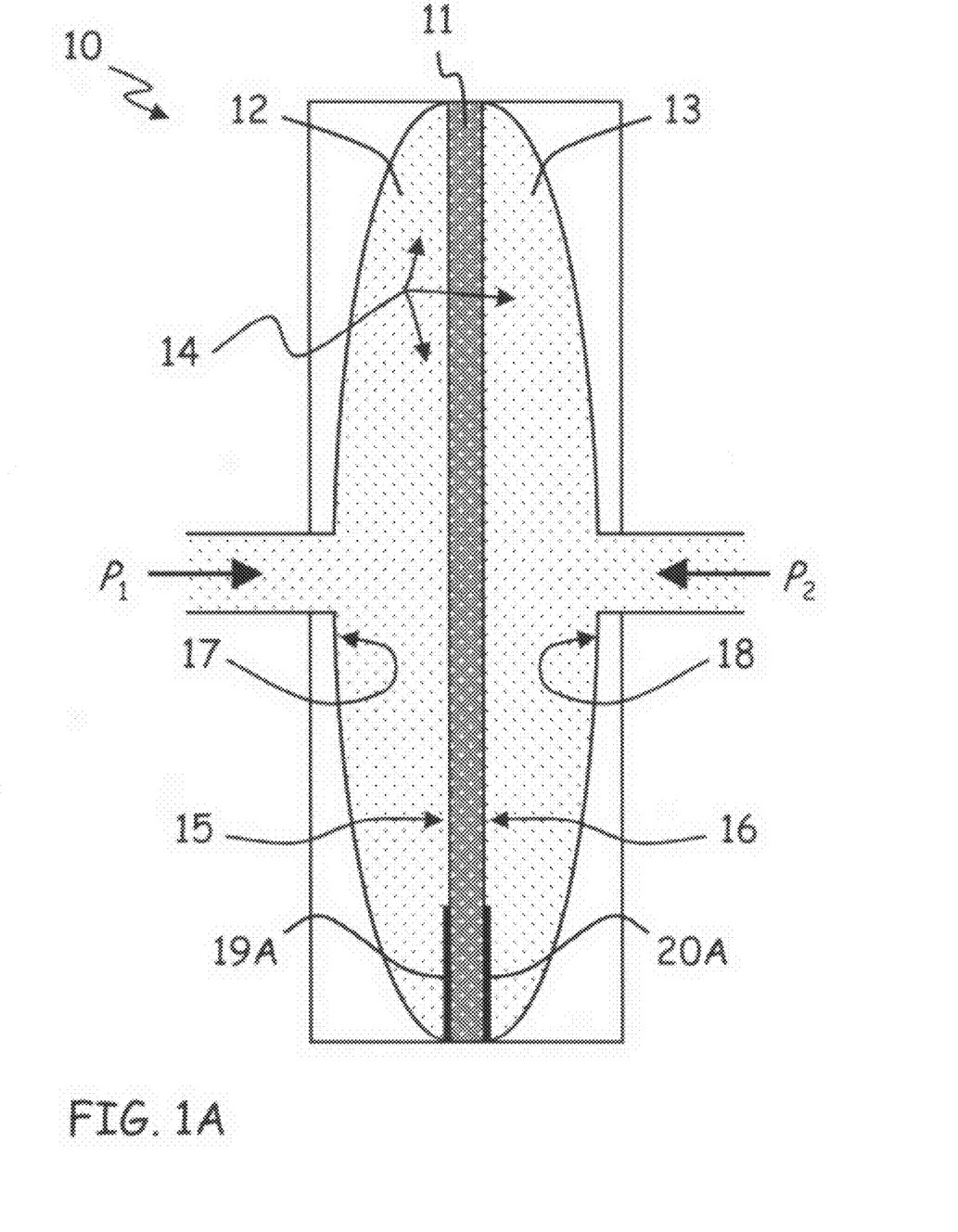
FIG. 1A is a cross-sectional schematic of a differential pressure sensor having a porous dielectric diaphragm, in an embodiment utilizing contact electrodes.

FIG. 1A is a cross-sectional schematic of pressure sensor 10 having porous dielectric diaphragm 11. Pressure sensor 10 comprises porous dielectric diaphragm 11, first pressure chamber 12, second pressure chamber 13, and fill fluid 14. In the embodiment of FIG. 1A, pressure sensor 10 utilizes contact electrodes 19A and 20A.

Porous dielectric diaphragm 11 comprises a rigid dielectric material having a high flow coefficient. Diaphragm 11 has first major surface 15 exposed to first pressure chamber 12, and second major surface 16 exposed to second pressure chamber 13. In one embodiment porous dielectric diaphragm 11 may be a porous ultra-thin silicon membrane. In other embodiments porous dielectric diaphragm 11 may be a porous polymer membrane, a porous ceramic diaphragm, or a porous fused silica diaphragm characterized by capillary passages traversing the diaphragm from first major surface 15 to second major surface 16. Porous dielectric diaphragm 11 may also comprise a porous thin film membrane of carbon nanotubes, a porous thin film membrane of carbon nanofibers, or a porous carbon nanotube mat. In other embodiments porous dielectric diaphragm 11 may be a composite porous dielectric diaphragm, comprising a combination of the above materials.

First pressure chamber 12 extends between first pressure wall 17, subject to first pressure $P_1$, and first major surface 15 of diaphragm 11. Second pressure chamber 13 extends between second pressure wall 18, subject to second pressure $P_2$, and second major surface 16 of diaphragm 11. In the embodiment of FIG. 1A, first pressure $P_1$ and second pressure $P_2$ are dynamic line pressures, and pressure sensor 10 is a differential pressure (DP) sensor.

Contact electrodes 19A and 20A are comprised of a conductive material, and positioned such that first contact electrode 19A contacts first major surface 15 of the diaphragm, and second contact electrode 20A contacts second major surface 16. Contact electrodes 19A and 20A may be relatively small compared to diaphragm 11, as shown in FIG. 1A, and fill fluid 14 may flow around the electrodes. The electrodes may also comprise holes or pores to allow the flow of fill fluid. Alternatively, contact electrodes 19A and 20A may form a frame around diaphragm 11, contacting the diaphragm proximate a perimeter and leaving an exposed central region for flow of fill fluid 14.

Fill fluid 14 fills first pressure chamber 12 and second pressure chamber 13, and permeates porous dielectric diaphragm 11 between first major surface 15 and second major surface 16. In one embodiment fill fluid 14 may be an electrolytic fluid such as an ionic solution. In other embodiments fill fluid 14 may be a polar fluid or a polar solution. In further embodiments fill fluid 14 may be a fluid colloid comprising a non-polar dispersing phase, such as an oil, and a polar or electrolytic dispersed phase, such as ionic particles or polar particles. Fill fluid 14 may further be a relatively incompressible fluid such as a liquid, or fill fluid 14 may be a relatively compressible fluid such as a gas.

Figure 1B:
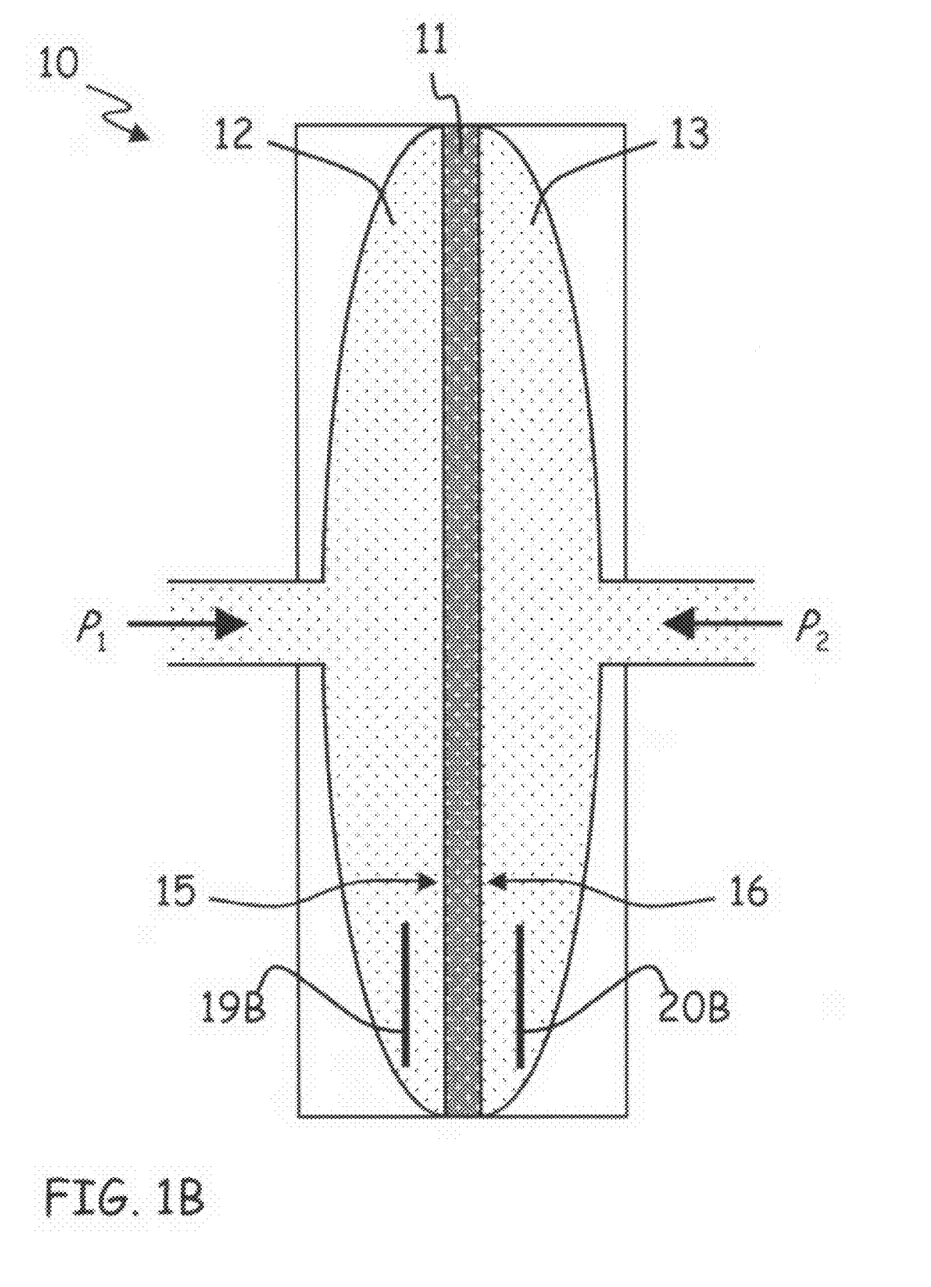
FIG. 1B is a cross-sectional schematic of the differential pressure sensor in FIG. 1A, in an embodiment utilizing parallel spaced electrodes.

FIG. 1B is a cross-sectional schematic of differential pressure sensor 10, in an embodiment utilizing parallel spaced electrodes 19B and 20B. In this embodiment, first parallel electrode 19B is positioned generally parallel to porous dielectric diaphragm 11, and spaced from first major surface 15. Second parallel electrode 20B is also positioned generally parallel to diaphragm 11, spaced from second major surface 16. In other respects, the elements of pressure sensor 10 as embodied in FIG. 1B are the same as for the embodiment in FIG. 1A.

FIG. 1B is illustrative of a variety of potential geometries and placements for parallel spaced electrodes 19B and 20B. Electrodes 19B and 20B may be relatively small compared to porous dielectric diaphragm 11, they may frame the diaphragm, or they may be comparable in both size and area to the diaphragm. Electrodes 19B and 20B may further be spaced from the major surfaces of the diaphragm such that they contact first pressure wall 17 and second pressure wall 18, or, alternatively, they may be spaced both from the major surfaces and from the pressure walls.

In operation of the DP embodiment of pressure sensor 10, as shown in either FIG. 1A or 1B, first pressure chamber 12 is subject to dynamic line pressure $P_1$ and second pressure chamber 13 is subject to dynamic line pressure $P_2$. Differential pressure $\Delta P$ is the difference between the two line pressures; that is, $\Delta P = P_1 - P_2$. FIGS. 1A and 1B represent an equilibrium pressure condition, such that $P_1 = P_2$ and differential pressure $\Delta P$ is zero ($\Delta P = 0$). In this condition there is no net flow of fill fluid 14 through porous dielectric diaphragm 11, and no potential signal is induced across the electrodes.

Figure 2:
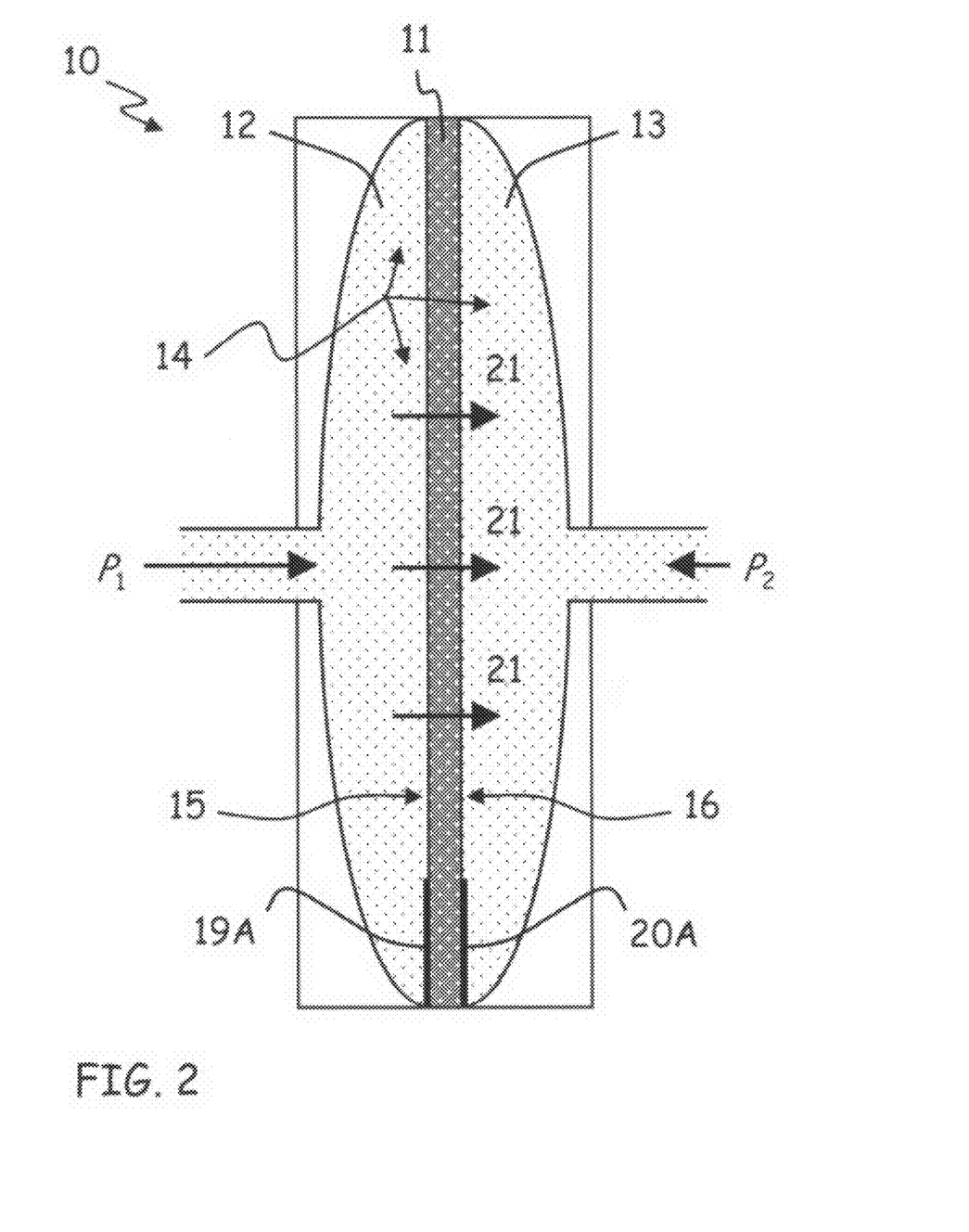
FIG. 2 is a cross-sectional schematic of the differential pressure sensor of FIG. 1A, subject to a non-equilibrium pressure condition.

FIG. 2 is a cross-sectional schematic of pressure sensor 10 having porous dielectric diaphragm 11, subject to a non-equilibrium pressure condition. FIG. 2 shows an embodiment utilizing contact electrodes 19A and 20A, but pressure sensor 10 may also utilize parallel spaced electrodes 19B and 20B, as described above, or a combination of contact electrodes and parallel spaced electrodes.

FIG. 2 illustrates the non-equilibrium condition $P_1 > P_2$, such that the pressure differential is positive; that is, $\Delta P > 0$. In this condition there is a net flow of fill fluid 14 in the sense of flow arrows 21, from first major surface 15 to second major surface 16 of porous dielectric diaphragm 11.

The flow of fill fluid 14 across porous dielectric diaphragm 11 induces a streaming current, which is the result of a process that may be characterized as reverse electro-osmosis. In standard electro-osmosis (also "electroosmosis" or "electro-endosmosis"), fluid flow is induced across a porous membrane or through a capillary by the application of an electric field. The fluid is in general an electrolytic fluid comprising a solvent and an ionic solute such as a salt, but the process is also applicable polar fluids such as water, or to fluid colloids comprising an electrolytic dispersed phase or a polar dispersed phase.

In the novel technique disclosed herein, the electro-osmotic process is reversed. That is, the flow induces an electric potential, rather than the potential inducing a flow. The flow, in turn, is induced by an applied pressure differential, which can be measured as a function of the induced potential.

Both standard electro-osmosis and reverse electro-osmosis result from surface interactions between the diaphragm and polar or ionic components of the fill fluid. In general, a porous fused silica diaphragm such as a porous silica membrane will acquire a net negative surface charge when in contact with the fill fluid. This surface charge preferentially attracts positively-charged ions (cations) in an electrolytic fill fluid, or, alternatively, the positive pole of a fill fluid comprising a dipole component. This creates charged boundary layers in the fill fluid, oriented along various porous surfaces within the diaphragm. The boundary layer has a thickness characterized by the Debye length, which, for typical fill fluids, is on the order of a nanometer (nm) or fractions of a micrometer ($\mu$m).

The charged boundary layers comprise stern layers, which are fixed with respect to the porous surfaces, and diffuse layers, which are mobile. When an external electrostatic potential is applied across the diaphragm, it induces flow in the diffuse layers. The diffuse layers drag the bulk of the fluid along with them, in a process commonly described as slip-flow electro-osmosis.

Slip flow electro-osmosis is employed in a wide range of micro-fluidic applications, including, for example, electro-osmotic pumps that require no moving parts. In contrast to the prior art, however, the novel technique disclosed here does not apply an external potential to induce slip-flow electro-osmosis. Instead, fill fluid 14 flows through porous dielectric diaphragm 11 in response to applied pressure differential $\Delta P$. This creates a streaming current in the diffuse layers, which generates a potential difference across diaphragm. Thus the flow results in an electric potential, not the other way around.

The streaming current flows until the potential reaches a level corresponding to the applied differential pressure $\Delta P$, which re-establishes pressure equilibrium. The ultimate potential, which may be characterized as a reverse electro-osmotic potential, is equal to the applied potential which would be required (in "standard" electro-osmosis) to obtain the pressure differential $\Delta P$. This allows $\Delta P$ to be determined from measurements of the potential difference across major surfaces 15 and 16 of porous dielectric diaphragm 11.

Figure 3A:
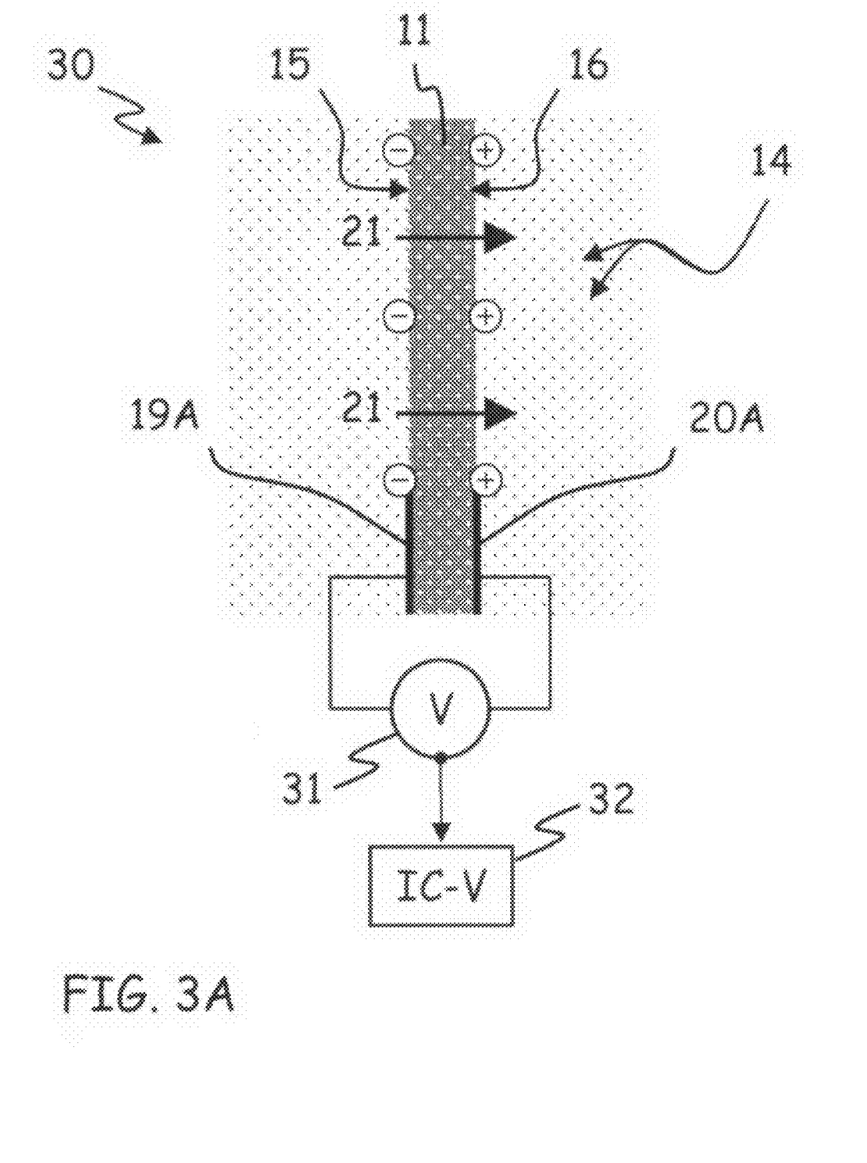
FIG. 3A is a schematic of a circuit for measuring a pressure-induced potential signal across a porous dielectric diaphragm, in an embodiment utilizing contact electrodes.

FIG. 3A is a schematic of circuit 30 for measuring pressure-induced potential signal $\Delta V$ across porous dielectric diaphragm 11, utilizing contract electrodes 19A and 20A. In this embodiment, circuit 30 comprises first contact electrode 19A, second contact electrode 20A, voltmeter 31 and integrated voltmeter circuit 32.

First contact electrode 19A contacts first major surface 15 of diaphragm 11, and second contact electrode 20A contacts second major surface 16. Voltmeter 31 is connected across contact electrodes 19A and 20A, and has an output connected to integrated circuit 32.

Circuit 30 is sensitive to pressure differential $\Delta P$ via the flow of fill fluid 14 across porous diaphragm 11, which in FIG. 3A has the direction of flow arrows 21. The bulk flow results in a streaming current in the diffuse charge layers along the porous surfaces of diaphragm 11, generating a reverse electro-osmotic potential as described above. The reverse electro-osmotic potential induces surface charges on major surfaces 15 and 16 of the diaphragm, and contact electrodes 19A and 20A respond to the surface charges. This yields potential signal $\Delta V$, which is measured by voltmeter 31.

In general, the polarity of the reverse electro-osmotic potential indicates the direction of flow. This, in turn, indicates which major surface of the diaphragm is subject to a greater pressure. In the embodiment shown in FIG. 3A, for example, the charged boundary layer has a positive polarity, reflecting a negative surface charge polarity on porous dielectric diaphragm 11. This yields a positive streaming current, which flows in the direction of arrows 21. In this situation ΔV will thus have a positive polarity for a positive pressure differential, as defined by $P_1 > P_2$ in FIG. 2. Other embodiments may provide a different relationship between the polarity of potential signal ΔV and pressure differential ΔP, but two will remain in one-to-one correspondence.

Integrated voltmeter circuit 32 comprises a voltage amplifier and an analog-to-digital converter (A/D). The voltage amplifier amplifies the output of voltmeter 31, and the A/D digitizes the output of the voltage amplifier. In one embodiment the output is a differential signal, the voltage amplifier is a differential voltage amplifier, and the A/D is a flash A/D. In other embodiments these elements may take other forms. Integrated voltmeter circuit 32 may also comprise a latch, to latch the output of the A/D.

In embodiments where potential signal ΔV may reach approximately five volts or higher, integrated voltmeter circuit 32 may further comprise a voltage isolation element consisting of at least one voltage isolation capacitor. In this embodiment the voltage amplifier may have an amplification of less than one.

Figure 3B:
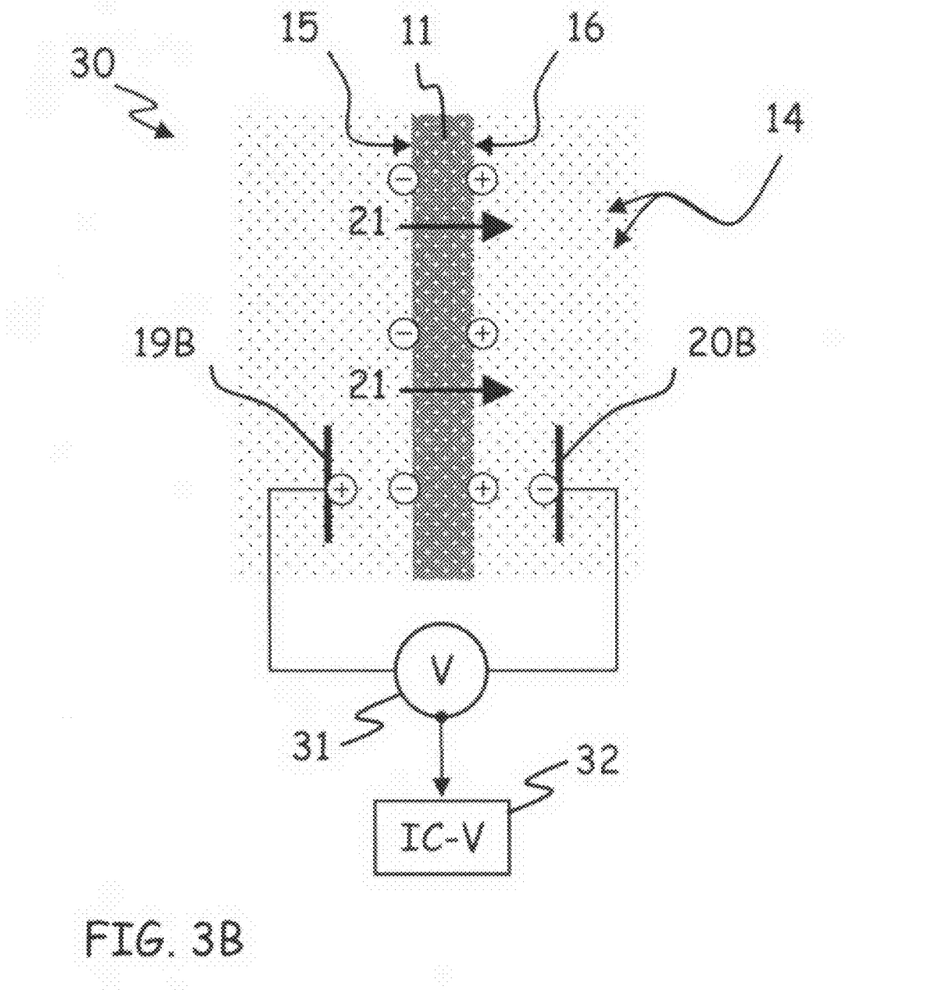
FIG. 3B is a schematic of the circuit in FIG. 3A, in an embodiment utilizing parallel spaced electrodes.

FIG. 3B is a schematic of circuit 30 for measuring pressure-induced potential signal ΔV across porous dielectric diaphragm 11, utilizing parallel spaced electrodes 19B and 20B. In this embodiment, circuit 30 comprises first parallel spaced electrode 19B, second parallel spaced electrode 20B, voltmeter 31 and integrated voltmeter circuit 32.

In the embodiment of FIG. 3B, parallel electrodes 19B and 20B are spaced from the major surfaces 15 and 16 of porous dielectric diaphragm 11. The reverse electro-osmotic potential polarizes porous dielectric diaphragm 11, resulting in a bound surface charge on first major surface 15, and a substantially equal but opposite bound surface charge on second major surface 16. The bound surface charges induce substantially equal but opposite free surface charges, or image charges, on the parallel spaced electrodes. This yields potential signal ΔV, corresponding to pressure differential ΔP. Note, however, that in this embodiment the polarity of ΔV may be reversed with respect to that obtained from contact electrodes 19A and 20A, as shown in FIG. 3A.

The various embodiments of circuit 30 illustrate a number of advantages inherent to pressure sensor 10. The reverse electro-osmotic potential allows pressure sensor 10 to operate with approximate pressure equilibrium between first pressure chamber 12 and second pressure chamber 13, such that porous dielectric diaphragm 11 is not substantially deformed. Thus the potential signal is largely independent of the elastic properties of diaphragm 11, and pressure sensor 10 is not subject to the characteristic limitations of mechanically-based pressure sensors in the prior art.

Pressure sensor 10 is also resistant to vibrations and other ambient effects, and does not exhibit significant hysteresis. This is because the relationship between potential signal ΔV and pressure differential ΔP depends primarily upon molecular properties, rather than mechanical characteristics. These properties include the viscosity and electric permittivity of fill fluid 14, the dielectric constant of porous dielectric diaphragm 11, and the characteristic zeta potential of the charged boundary layer. These properties are not substantially dependent upon vibrations or hysteresis.

Moreover, porous dielectric diaphragm 11 may have a high flow constant and a high dielectric breakdown potential, providing pressure sensor 10 with sensitivity to rapid dynamical pressure changes over a wide range of pressures. Fill fluid 14 and porous dielectric diaphragm 11 may further be selected such that the relevant molecular characteristics are minimally sensitive to temperature fluctuations in a broad environmental range, from approximately −40 C to approximately +85 C. This embodiment provides a precise, stable pressure indicator in a cost-effective package with a high operational lifetime, which does not require new production line technology, and which is reliable over a wide range of pressures, temperatures and other environmental conditions.

Figure 4:
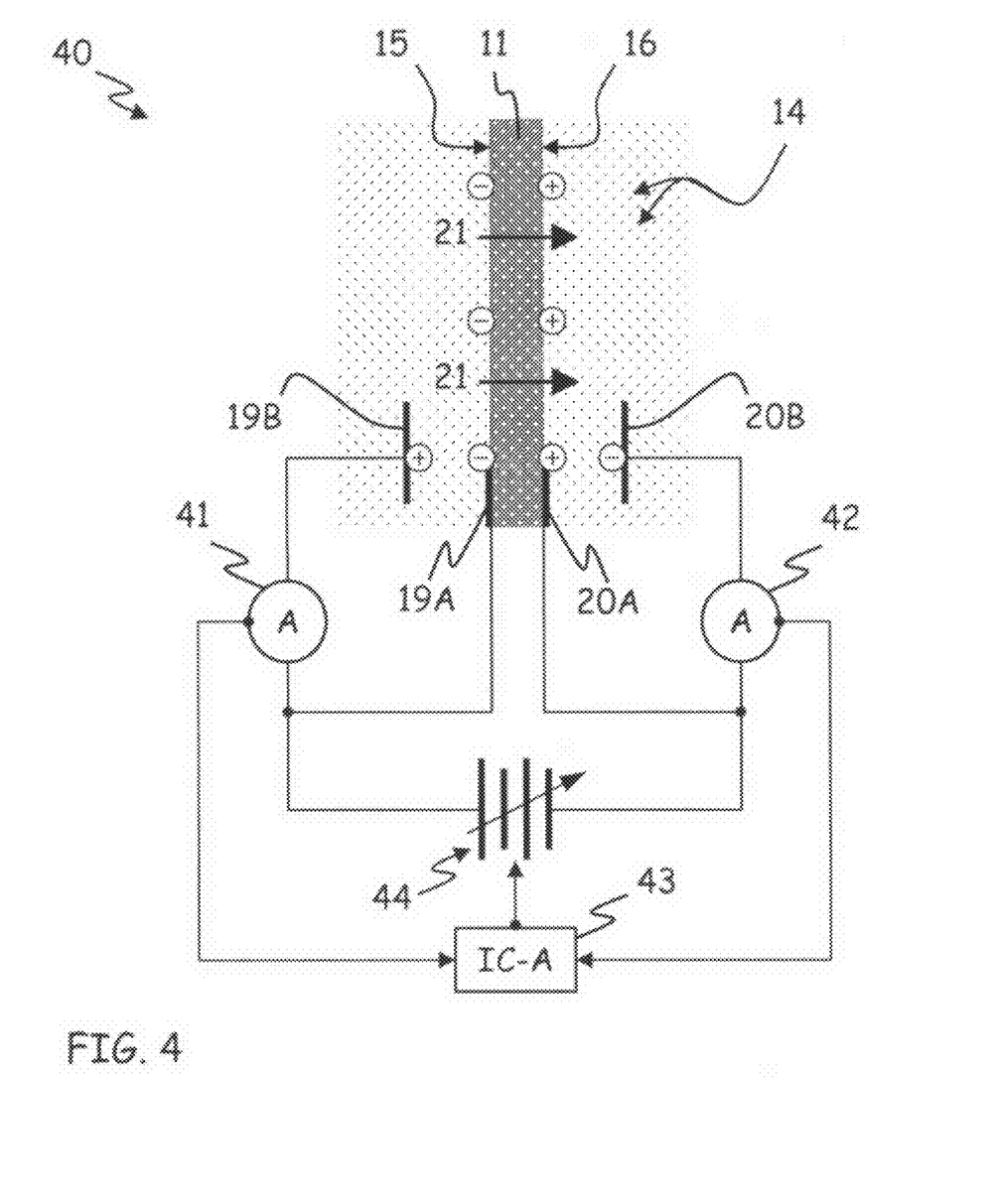
FIG. 4 is a schematic of a circuit for measuring pressure-induced current signals across a porous dielectric diaphragm.

FIG. 4 is a schematic of circuit 40 for measuring pressure-induced current signals $I_1$ and $I_2$ across porous dielectric diaphragm 11. Circuit 40 comprises contact electrodes 19A and 20A, parallel spaced electrodes 19B and 20B, first ammeter 41, second ammeter 42, integrated ammeter circuit 43, and optional potential supply 44.

Contact electrodes 19A and 20A are described with respect to FIG. 1A, and parallel spaced electrodes 19B and 20B are described with respect to FIG. 1B. First ammeter 41 measures first current signal $I_1$, between contact electrode 19A and parallel spaced electrode 19B, and second ammeter 42 measures second current signal $I_2$, between contact electrode 20A and parallel spaced electrode 20B. Ammeters 41 and 42 have outputs connected to integrated ammeter circuit 43.

Integrated ammeter circuit 43 comprises a current amplifier, an A/D, and, optionally, a variable potential controller to control potential supply 44. The current amplifier amplifies current signals from ammeters 41 and 42, and the A/D digitizes the output of the current amplifier. In one embodiment the current amplifier is an ultra-low input current amplifier and the A/D is a flash A/D. Integrated ammeter circuit 43 may further comprise a latch, to latch the output of the flash A/D.

In circuit 40, current signals $I_1$ and $I_2$ depend in part upon the potential across contact electrodes 19A and 20A. In embodiments without optional potential supply 44, this is approximately the reverse electro-osmotic potential, because contact electrodes 19A and 20A are in contact with major surfaces 15 and 16 of porous dielectric diaphragm 11. In this embodiment, therefore, pressure differential ΔP is substantially a function of $I_1$ and $I_2$.

In an alternate embodiment, optional potential supply 44 may be used to impose variable potential $V_i$ across contact electrodes 19A and 20A, such current signals $I_1$ and $I_2$ are approximately minimized. In this embodiment charge leakage is reduced from contact electrodes 19A and 20A, and differential pressure ΔP may be substantially a function of variable potential $V_i$. This embodiment provides a pressure measurement applicable to static or steady-state pressures. Variable potential $V_i$ may also be dynamically controlled via integrated ammeter circuit 43, providing sensitivity to variable pressure differentials.

Variable potential $V_i$ may further be applied such that current signals $I_1$ and $I_2$ are not minimized. In this embodiment, current signals $I_1$ and $I_2$ provide independent measures of the resistivity of fill fluid 14 on each side of porous dielectric diaphragm 11. To the extent that fill fluid 14 is a compressible fluid such as a gas, the resistivity depends upon the density, which is a function of pressure. This embodiment is sensitive to both to steady-state and variable pressure differentials, and provides a measure of differential pressure ΔP via the individual pressures $P_1$ and $P_2$.

Figure 5:
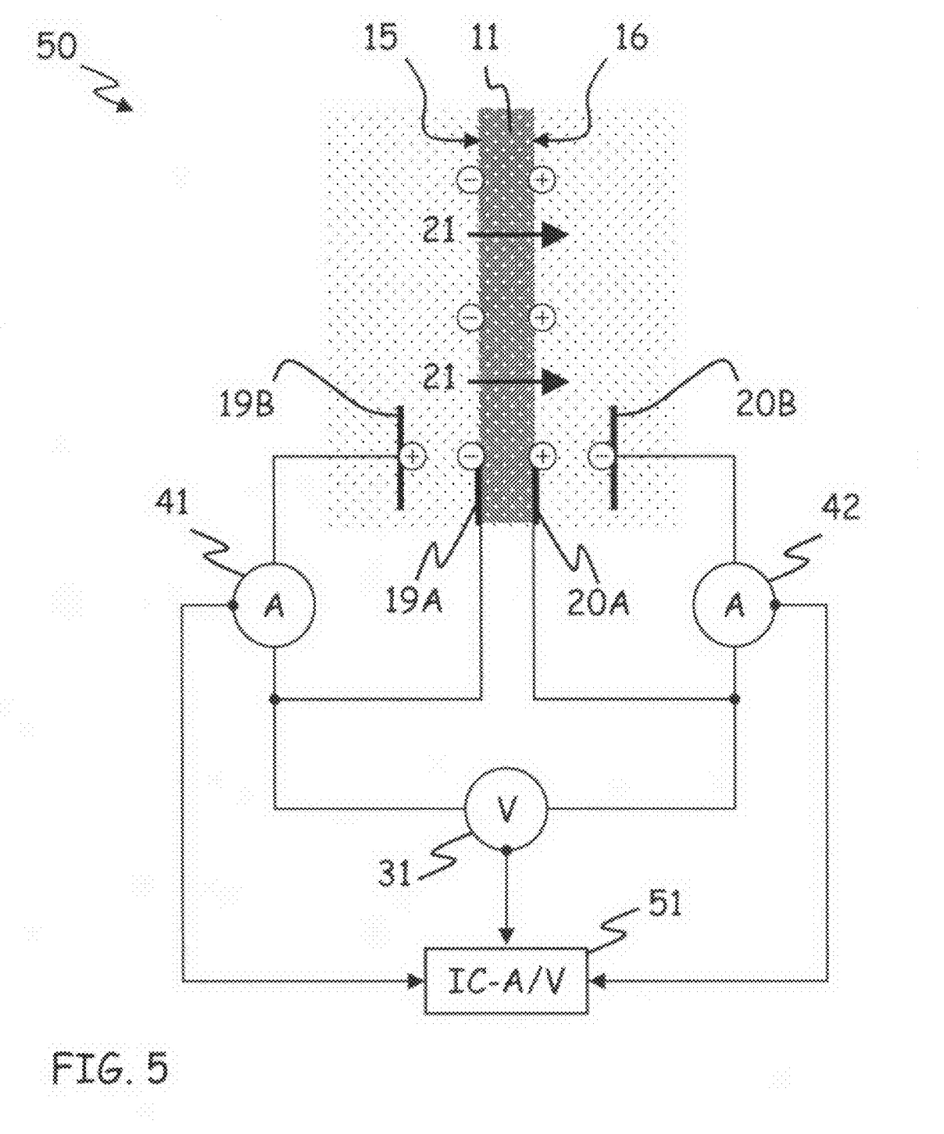
FIG. 5 is a schematic of a circuit for measuring pressure-induced potential and current signals across a porous dielectric diaphragm.

FIG. 5 is a schematic of circuit 50 for measuring pressure-induced potential signal ΔV and pressure-induced current signals $I_1$ and $I_2$ across porous dielectric diaphragm 11. Circuit 50 comprises first and second contact electrodes 19A and 20A, first and second parallel spaced electrodes 19B and 20B, voltmeter 31, and first and second ammeters 41 and 42. Circuit 50 further comprises integrated current/voltage circuit 51, which in turn comprises integrated voltmeter circuit 32 of FIG. 3A and integrated ammeter circuit 43 of FIG. 4.

Circuit 50 is a general-purpose circuit, in which both potential signal ΔV and current signals $I_1$ and $I_2$ may be measured. Circuit 50 preserves the inherent advantages of circuits 30 and 40, and offers reliable, precise, and sensitive measurements of both dynamical and steady-state pressure differentials.

Figure 6:
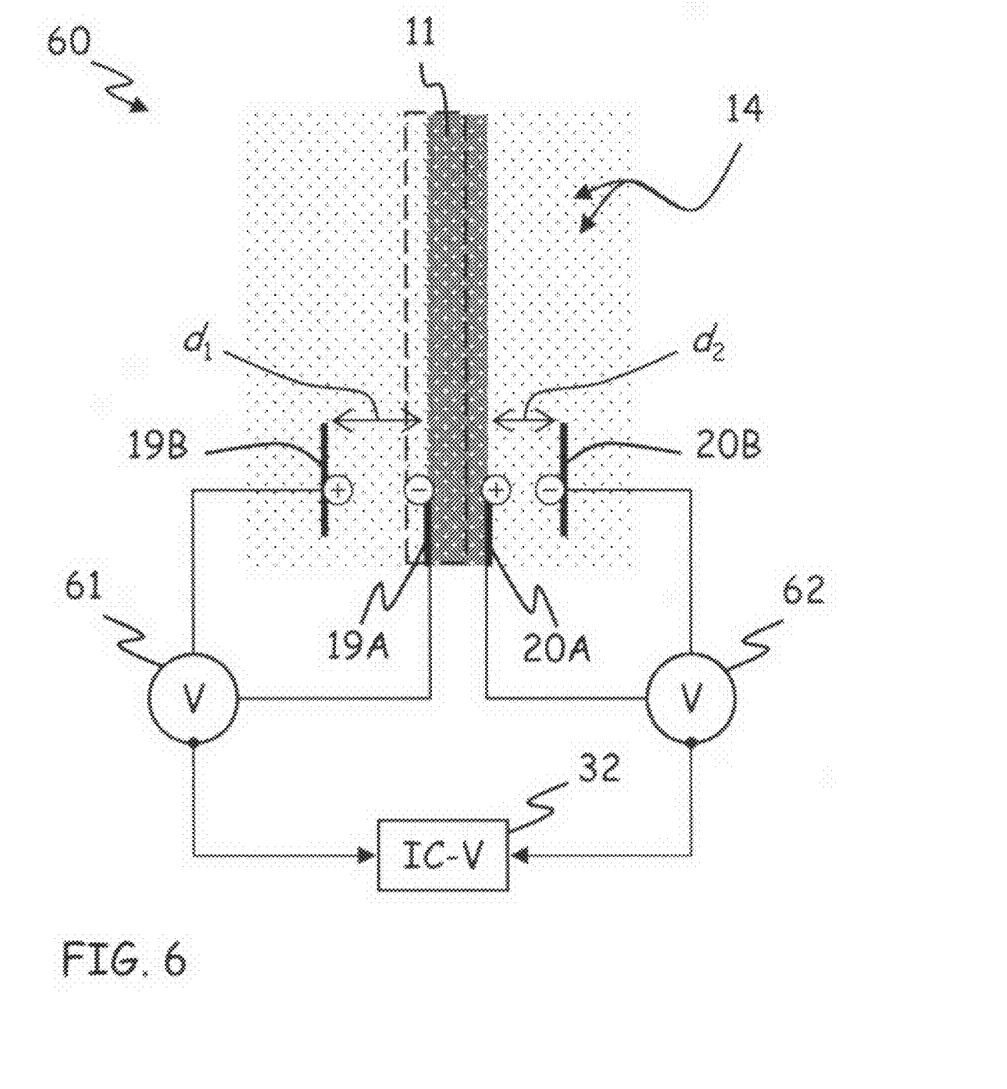
FIG. 6 is a schematic of a circuit for measuring a capacitive pressure correction across a displaced porous dielectric diaphragm.

FIG. 6 is a schematic of circuit 60 for measuring a capacitive pressure correction across displaced porous dielectric diaphragm 11. Circuit 60 comprises contact electrodes 19A and 20A, parallel spaced electrodes 19B and 20B, and capacitive correction voltmeters 61 and 62.

FIG. 6 illustrates a situation in which a dynamic pressure differential may displace diaphragm 11 from its equilibrium position (shown by dashed lines). Typically, any such displacement will be small. It may moreover decrease as fill fluid 14 diffuses across porous dielectric diaphragm 11, re-establishing pressure equilibrium. Pressure sensor 10 is not, however, limited to applications in which the diaphragm experiences no deflection at all, and, should such deflection occur, a circuit such as circuit 60 may be utilized to correct for it.

Any displacement of diaphragm 11 will change capacitive spacing $d_1$, between electrodes 19A and 19B, and $d_2$, between electrodes 20A and 20B. This will in turn induce signals in capacitive correction voltmeters 61 and 62, which are connected to integrated voltmeter circuit 31. In this embodiment integrated voltmeter circuit 31 comprises additional electronic components configured to correct the pressure measurement based upon these capacitive signals. Circuit 60 may be utilized in combination with any of circuits 30, 40, or 50, as described above, or circuit 60 may be independently utilized.

Figure 7A:
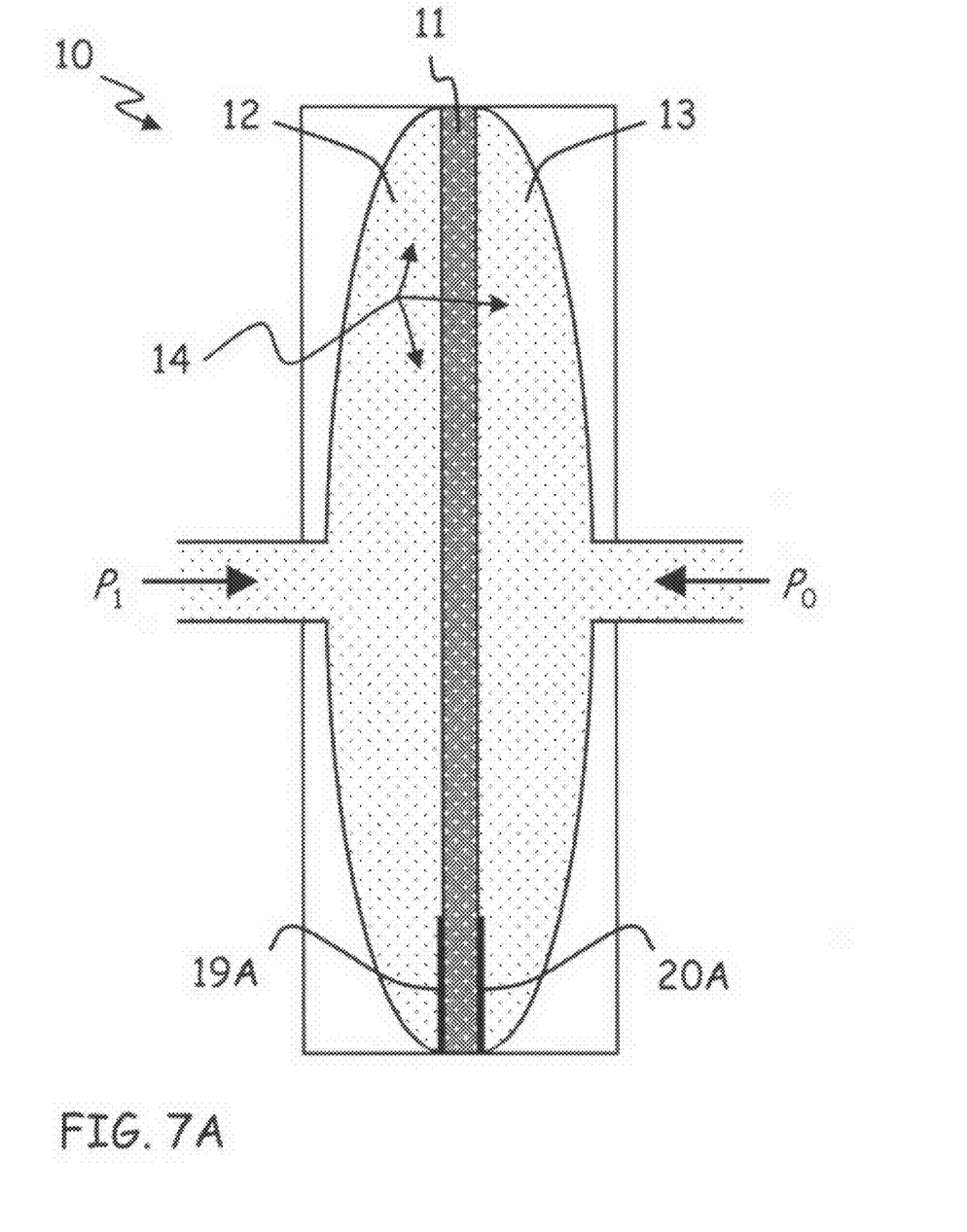
FIG. 7A is a cross-sectional schematic of the pressure sensor in FIG. 1A, in a gauge pressure sensing embodiment.

FIG. 7A is a cross-sectional schematic of pressure sensor 10, in a gauge pressure (GP) sensing embodiment. Pressure sensor 10 comprises porous dielectric diaphragm 11, first pressure chamber 12, second pressure chamber 13 and fill fluid 14, as described above, and may utilize contact electrodes 19A and 20A, as shown, or another electrode configuration.

In contrast to the DP embodiment of FIG. 1A, the GP embodiment of FIG. 7A has second pressure chamber 13 subject to reference pressure $P_0$, not line pressure $P_2$. Thus the GP embodiment measures gauge pressure $P_g=P_1-P_0$, not differential pressure $\Delta P=P_1-P_2$. In other respects the GP embodiment retains the advantages of the DP embodiment, and may be employed with any of the various circuits described above.

In one GP embodiment, reference pressure $P_0$ is an atmospheric pressure, and gauge pressure $P_g$ is a standard gauge pressure. In other embodiments reference pressure $P_0$ may be another ambient pressure, or another environmental pressure. The GP embodiment of pressure sensor 10 may also be a sealed pressure sensor embodiment.

Figure 7B:
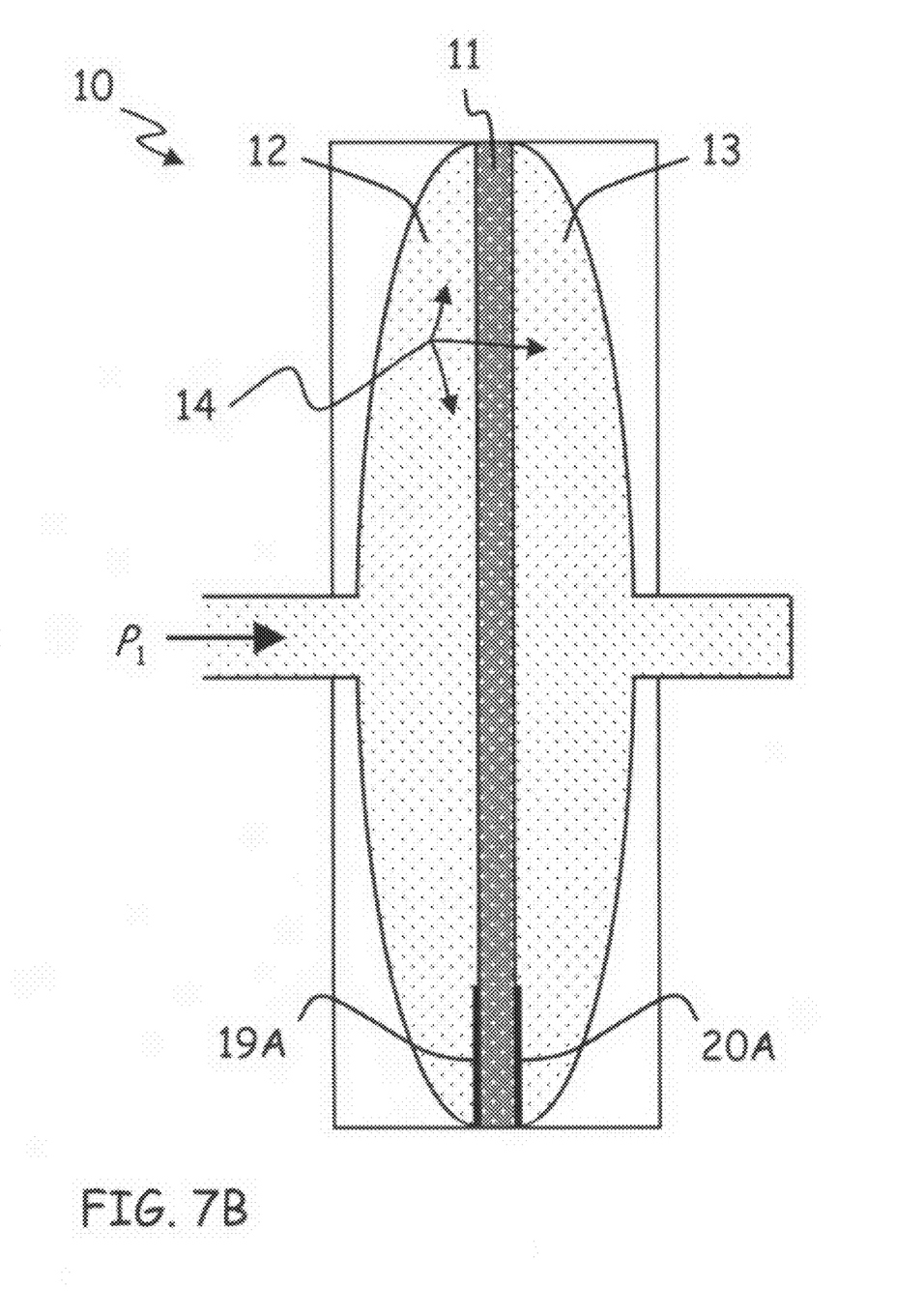
FIG. 7B is a cross-sectional schematic of the pressure sensor in FIG. 1A, in an absolute pressure sensing embodiment.

FIG. 7B is a cross-sectional schematic of pressure sensor 10, in an absolute pressure (AP) sensing embodiment. The AP embodiment is distinguished from the DP and GP embodiments in that second pressure chamber 13 is subject to a vacuum pressure $P_v \approx 0$. Thus the AP embodiment measures absolute pressure $P_a \approx P_1$, not differential pressure $\Delta P$ or gauge pressure $P_g$. In other respects the AP embodiment shares the advantages of the DP and GP embodiments, as described above.

In operation of the AP embodiment in FIG. 7B, second pressure chamber 13 may experience vaporization of fill fluid 14, such that $P_v$ may be a vapor pressure, as opposed to an absolute vacuum pressure. In this event fill fluid 14 may exhibit a small vapor pressure throughout the operational temperature range, such that the difference between the vapor pressure and an absolute vacuum pressure is small. Alternatively, the AP embodiment may comprise a vacuum pump to maintain a lower pressure in second pressure chamber 13, or a cooling element to lower the vapor pressure of fill fluid 14.

The structural and functional details disclosed herein, and the specific terminology used, are for the purposes of description, not limitation. Although the present invention has been described with reference to preferred embodiments, workers skilled in the art will recognize that changes may be made in form and detail without departing from the spirit and scope of the invention.

The invention claimed is:

1. A pressure sensor comprising:
    a first pressure chamber containing fill fluid at a first pressure;
    a second pressure chamber containing fill fluid at a second pressure;
    a porous dielectric diaphragm comprising a porous polymer membrane having a first major surface exposed to the first pressure chamber and a second major surface exposed to the second pressure chamber;
    a first contact electrode positioned in contact with the first major surface; and
    a second contact electrode positioned in contact with the second major surface;
    wherein a potential signal is induced across the first and second electrodes by a potential generated across the first and second major surfaces of the porous dielectric diaphragm.

2. The pressure sensor of claim 1, wherein the potential signal on the first and second contact electrodes is induced in response to surface charges on the first and second major surfaces of the porous dielectric diaphragm.

3. The pressure sensor of claim 1, additionally comprising first and second parallel spaced electrodes positioned generally parallel to the porous dielectric diaphragm and spaced from the first and second major surfaces of the porous dielectric diaphragm.

4. The pressure sensor of claim 1, wherein the potential generated across the first and second major surfaces of the porous dielectric diaphragm comprises a reverse electro-osmotic potential generated by a streaming current that flows across the porous dielectric diaphragm.

5. The pressure sensor of claim 1, wherein the potential across the first and second major surfaces of the porous dielectric diaphragm has a polarity indicative of the greater of the first pressure and the second pressure.

6. The pressure sensor of claim 1, wherein the fill fluid comprises a non-polar phase.

7. The pressure sensor of claim 1, wherein the fill fluid comprises an electrolytic phase, the electrolytic phase comprising ionic particles.

8. The pressure sensor of claim 1, wherein the first pressure and the second pressure are dynamic line pressures.

9. The pressure sensor of claim 1, wherein the first pressure is a dynamic line pressure and the second pressure is a reference pressure.

10. The pressure sensor of claim 1, wherein the first pressure is a dynamic line pressure and the second pressure is a vacuum pressure.

11. The pressure sensor of claim 1, wherein the fill fluid comprises a fluid colloid, the fluid colloid comprising a non-polar dispersing phase and one of an electrolytic dispersed phase or a polar dispersed phase.

12. A pressure sensor, comprising:
    a first pressure chamber;
    a second pressure chamber;
    a porous dielectric diaphragm that divides the first pressure chamber, at a first major surface of the diaphragm, from the second pressure chamber, at a second major surface of the diaphragm;
    a first contact electrode positioned in contact with the first major surface of the porous dielectric diaphragm, such that the first contact electrode responds to a first surface charge on the first major surface of the diaphragm;
    a second contact electrode positioned in contact with the second major surface of the porous dielectric diaphragm, such that the second contact electrode responds to a second surface charge on the second major surface of the diaphragm;

first and second parallel spaced electrodes positioned generally parallel to the porous dielectric diaphragm and spaced from the first and second major surfaces of the porous dielectric diaphragm; and a fill fluid that flows through the diaphragm in response to a pressure differential between the first pressure and the second pressure.

13. The pressure sensor of claim 12, wherein the surface charges characterize a reverse electro-osmotic potential generated by a streaming current that flows across the porous dielectric diaphragm.

14. The pressure sensor of claim 12, additionally comprising a voltmeter that measures a potential signal across the first contact electrode and the second contact electrode.

15. The pressure sensor of claim 12, additionally comprising:
a first ammeter that measures a first current signal between the first contact electrode and the first parallel spaced electrode; and
a second ammeter that measures a second current signal between the second contact electrode and the second parallel spaced electrode.

16. The pressure sensor of claim 15, additionally comprising a potential supply that provides a variable potential across the first contact electrode and the second contact electrode.

17. The pressure sensor of claim 16, wherein the variable potential approximately minimizes the current signals.

18. The pressure sensor of claim 15, additionally comprising:
a first capacitive correction voltmeter that measures a capacitive signal across the first contact electrode and the first parallel spaced electrode; and
a second capacitive correction voltmeter that measures a capacitive signal across the second contact electrode and the second parallel spaced electrode.

19. A method for sensing pressure, the method comprising:
applying first and second pressures to fill fluid in first and second pressure chambers of a pressure sensor having a porous dielectric diaphragm, the porous dielectric diaphragm comprising a porous polymer membrane having first and second major surfaces exposed to the first and second pressure chambers;
sensing a potential induced on first and second contact electrodes positioned in contact with the first and second major surfaces of the porous dielectric diaphragm; and
producing an output representative of a pressure differential between the first and second pressures based on the potential induced on the first and second contact electrodes, wherein the potential is a function of surface charges on the first and second major surfaces of the porous dielectric diaphragm.

20. The method of claim 19, wherein applying first and second pressures comprises applying one or more of a dynamic line pressure, a reference pressure, or a vacuum pressure.

21. The method of claim 19, wherein producing an output comprises sensing a potential signal across first and second parallel spaced electrodes positioned parallel to the porous dielectric diaphragm and spaced from the first and second major surfaces of the porous dielectric diaphragm.

22. The method of claim 21, wherein producing an output comprises sensing a first current signal between the first contact electrode and the first parallel spaced electrode, and a second current signal between the second contact electrode and the second parallel spaced electrode.

23. The method of claim 22, wherein producing an output further comprises applying a variable potential across the first and second contact electrodes.

24. The method of claim 21, wherein producing an output comprises sensing a first capacitive signal between the first contact electrode and the first parallel spaced electrode, and a second capacitive signal between the second contact electrode and the second parallel spaced electrode.

25. A pressure sensor comprising:
a first pressure chamber containing fill fluid at a first pressure;
a second pressure chamber containing fill fluid at a second pressure;
a porous dielectric diaphragm having a first major surface exposed to the first pressure chamber and a second major surface exposed to the second pressure chamber;
a first electrode positioned with respect to the first major surface; and
a second electrode positioned with respect to the second major surface;
wherein a potential signal is induced across the first and second electrodes by a potential generated across the first and second major surfaces of the porous dielectric diaphragm; and
wherein the porous dielectric diaphragm comprises one or more of a porous thin film of carbon nanotubes, a porous thin film of carbon nanofibers, or a porous carbon nanotube mat.

26. The pressure sensor of claim 25, wherein the porous dielectric diaphragm comprises a porous thin film of carbon nanotubes.

27. The pressure sensor of claim 25, wherein the porous dielectric diaphragm comprises a porous thin film of carbon nanofibers.

28. The pressure sensor of claim 25, wherein the porous dielectric diaphragm comprises a porous carbon nanotube mat.

29. A pressure sensor comprising:
a first pressure chamber containing fill fluid at a first pressure;
a second pressure chamber containing fill fluid at a second pressure;
a porous dielectric diaphragm having a first major surface exposed to the first pressure chamber and a second major surface exposed to the second pressure chamber;
a first electrode positioned with respect to the first major surface; and
a second electrode positioned with respect to the second major surface;
wherein a potential signal is induced across the first and second electrodes by a potential generated across the first and second major surfaces of the porous dielectric diaphragm; and
wherein the fill fluid comprises a fluid colloid, the fluid colloid comprising a non-polar dispersing phase and one of an electrolytic dispersed phase or a polar dispersed phase.

* * * * *